(12) United States Patent
Ahn et al.

(10) Patent No.: US 7,778,654 B2
(45) Date of Patent: Aug. 17, 2010

(54) METHOD FOR CONTROLLING WIRELESS APPLIANCES USING SHORT MESSAGE SERVICE, HOME NETWORK SYSTEM AND MOBILE TERMINAL

(75) Inventors: Sang-Jun Ahn, Seoul (KR); Woo-Jun Choi, Suwon-si (KR); Young-Kyu Bae, Suwon-si (KR); Young-Seop Han, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 831 days.

(21) Appl. No.: 11/582,691

(22) Filed: Oct. 17, 2006

(65) Prior Publication Data

US 2007/0197236 A1 Aug. 23, 2007

(30) Foreign Application Priority Data

Feb. 23, 2006 (KR) .................... 10-2006-0017774

(51) Int. Cl.
*H04W 4/00* (2009.01)
(52) U.S. Cl. .................. 455/466; 455/41.2; 455/426.1; 455/426.2; 370/338
(58) Field of Classification Search .............. 455/466, 455/41.2, 352, 418–420, 426.1–426.2; 370/338; 340/825.31, 825.34
See application file for complete search history.

(56) References Cited

U.S. PATENT DOCUMENTS

| | | | | |
|---|---|---|---|---|
| 6,121,967 A | * | 9/2000 | Foster et al. | ................. 715/772 |
| 2003/0078032 A1 | * | 4/2003 | Pei et al. | ..................... 455/411 |
| 2003/0140062 A1 | * | 7/2003 | Ueno | ....................... 707/104.1 |
| 2003/0191825 A1 | * | 10/2003 | Miyazaki et al. | ............ 709/220 |

FOREIGN PATENT DOCUMENTS

| | | |
|---|---|---|
| KR | 1020030034413 | 5/2003 |
| KR | 1020030075020 | 9/2003 |
| KR | 1020050021695 | 3/2005 |
| KR | 1020060080968 | 7/2006 |

* cited by examiner

*Primary Examiner*—Kamran Afshar
*Assistant Examiner*—Marisol Fahnert
(74) *Attorney, Agent, or Firm*—The Farrell Law Firm, LLP (57) ABSTRACT

Disclosed are a system and method for controlling home appliances using a short message service. When receiving a short message including an access code from a mobile terminal, the home server checks the status of the connected home appliances and sends a short message including control codes corresponding to the status of the home appliances to the mobile terminal. The mobile terminal checks the control codes to confirm the status of the home appliances, and displays corresponding images. When the user requests to control the status of a specific home appliance, the mobile terminal automatically generates a corresponding short message and sends the short message to the home server. The home server checks the message, controls the corresponding home appliance, and then sends a short message including current status information of the controlled home appliance to the mobile terminal.

15 Claims, 7 Drawing Sheets

| TYPE OF HOME APPLIANCE | CONTROL CODE |
|---|---|
| LIGHT | A |
| GAS VALVE | B |
| DOORLOCK | C |
| SECURITY CAMERA | D |
| TEMPERATURE ADJUSTER | E |
| CURTAIN | F |

(b)

| LOCATION OF HOME APPLIANCE | CONTROL CODE |
|---|---|
| FIRST ROOM | 0 |
| SECOND ROOM | 1 |
| CHILD'S ROOM | 2 |
| STUDY ROOM | 3 |
| LIVING ROOM | 4 |
| BATHROOM IN THE FIRST ROOM | 5 |
| BATHROOM | 6 |
| KITCHEN | 7 |

(c)

| STATUS | CONTROL CODE |
|---|---|
| ON | 1 |
| OFF | 0 |

| | | | | |
|---|---|---|---|---|
| (A) | 💡 + FIRST ROOM + OFF = | 💡 FIRST ROOM |
| CONTROL CODES: | A　　　　0　　　　0 | |
| (B) | 💡 + SECOND ROOM + ON = | 💡 SECOND ROOM |
| CONTROL CODES: | A　　　　1　　　　1 | |
| (C) | 🔧 + KITCHEN + ON = | 🔧 KITCHEN |
| CONTROL CODES: | B　　　　7　　　　1 | |
| (D) | 🪟 + FIRST ROOM + OFF = | 🪟 FIRST ROOM |
| CONTROL CODES: | F　　　　0　　　　0 | |

(b)

| ACCESS CODE | PASSWORD | CONTROL CODES |
|---|---|---|

METHOD FOR CONTROLLING WIRELESS APPLIANCES USING SHORT MESSAGE SERVICE, HOME NETWORK SYSTEM AND MOBILE TERMINAL

PRIORITY

This application claims priority to an application entitled "Method for Controlling Wireless Appliances Using Short Message Service, Home Network System and Mobile Terminal" filed with the Korean Intellectual Property Office on Feb. 23, 2006 and assigned Serial No. 2006-17774, the contents of which are incorporated herein by reference.

BACKGROUND OF THE INVENTION

1. Field of the Invention

The present invention relates generally to a method for controlling wireless appliances, a home network system and a mobile terminal capable of carrying out the method, and more particularly to a method for controlling home appliances using a short message service, a home network system and a mobile terminal for carrying out the method.

2. Description of the Related Art

Generally, home automation (HA) systems automatically control various electric or electronic home appliances utilizing electronic technologies. The home automation systems enhance comfort and convenience for subscribers. For example, the systems make life easier and more enjoyable by automatically adjusting the lighting in a room and providing wireless remote control of various home appliances. Using a home automation system, subscribers can control various functions and appliances in their home even when they are away from home. Subscribers can also monitor and prevent any gas leakage, fire or home invasion while away from home.

In such a home automation or home network system, subscribers generally remotely control wireless devices in their homes via a wireless Internet (WAP, Wireless Application Protocol) or a short message service (SMS). The WAP based control is a technique for controlling home appliances using a preset menu in a mobile terminal. The SMS based control is a technique that allows a user to control each home appliance by directly inputting a corresponding control signal in text.

To control home appliances using WAP, a user has to access WAP services for authentication and operate a mobile terminal to select an appliance to be controlled. Such WAP access and authentication procedures are required even for a simple control of a home appliance, which is time-consuming and incurs wireless data communication fees. In addition, since a WAP server is needed to store a control menu, the WAP based control can be implemented only in a large housing complex.

To overcome the drawbacks of the WAP based control, a method for controlling home appliances using an SMS has been proposed. In this method, a user has to directly input control values corresponding to the respective appliances in a short message.

More specifically, the user has to select one of the home appliances and directly input a control value corresponding to the feature of the selected appliance in order to transfer a control signal to the appliance. In this connection, the user should memorize control values representing the respective home appliances and values for controlling the status of each appliance or write down such values on paper to input them in a short message. It is difficult to memorize all the control values unique to a number of home appliances and input each value correctly. Even after controlling a specific appliance using a short message, the user is not informed of the changed status of the controlled appliance. Thus, the user cannot immediately confirm whether the appliance was properly controlled.

SUMMARY OF THE INVENTION

Accordingly, the present invention has been made to solve the above-mentioned problems occurring in the prior art, and an object of the present invention is to provide a method for easily controlling wireless appliances via a short message service without having to input a control code, a home network system and a mobile terminal for carrying out the method.

Another object of the present invention is to provide a method for controlling wireless appliances using a short message service on a mobile terminal which displays the status of each controllable wireless appliance on a display screen thereof and allows a user to change the status of a selected wireless appliance without inputting a control code for controlling the wireless appliance in a short message, a home network system and a mobile terminal for carrying out the method.

In order to accomplish the above objects of the present invention, there is provided a method for controlling home appliances using a short message service in a home network system which includes a home server, a mobile terminal for communicating with the home server through a mobile communication network, and at least one home appliance connected wirelessly to the home server, said method including a short message sending step in which the mobile terminal automatically generates a short message including a previously stored access code when an access request to the home server is inputted by a user, and sends the short message to the home server, a short message responding step in which the home server receives the short message requesting access from the mobile terminal, generates a short message including control codes corresponding to the status of each home appliance, and sends the generated short message to the mobile terminal, and a status displaying step in which the mobile terminal receives the short message including status information of each home appliance, checks the control codes included in the short message to confirm the status of each home appliance, and displays an image representing the status of each home appliance.

In accordance with the present invention, there is provided a home network system which includes a mobile terminal for automatically generating a short message including a previously stored access code when an access request to a home server is inputted by a user, sending the short message to the home server, receiving a short message including status information of each home appliance from the home server, checking control codes included in the received short message to confirm the status of each home appliance, and displaying an image representing the status of each home appliance, and the home server for checking connected home appliances when receiving a short message requesting access from the mobile terminal, generating a short message including control codes corresponding to the status of each home appliance, and sending the generated short message to the mobile terminal.

In accordance with the present invention, there is provided a mobile terminal for controlling home appliances using a short message service in a home network system which includes a home server, the mobile terminal for communicating with the home server through a mobile communication network, and at least one home appliance connected wirelessly to the home server, said mobile terminal including a memory for storing a table consisting of first control codes representing the types of home appliances, second control codes representing the locations of the home appliances, and third control codes representing the status of the home appliances, and a control unit for automatically generating a short message including a previously stored access code when an access request to the home server is inputted by a user, and sending the short message to the home server.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted for the sake of clarity and conciseness.

The present invention provides a method for controlling home appliances using a short message service in a home network system. In the system, a mobile terminal has a graphic user interface (GUI) which enables a user to select a home appliance to be controlled or the desired status of a home appliance by selecting a home appliance control menu displayed on a display screen, without having to directly input corresponding control codes in a short message.

Figure 1:
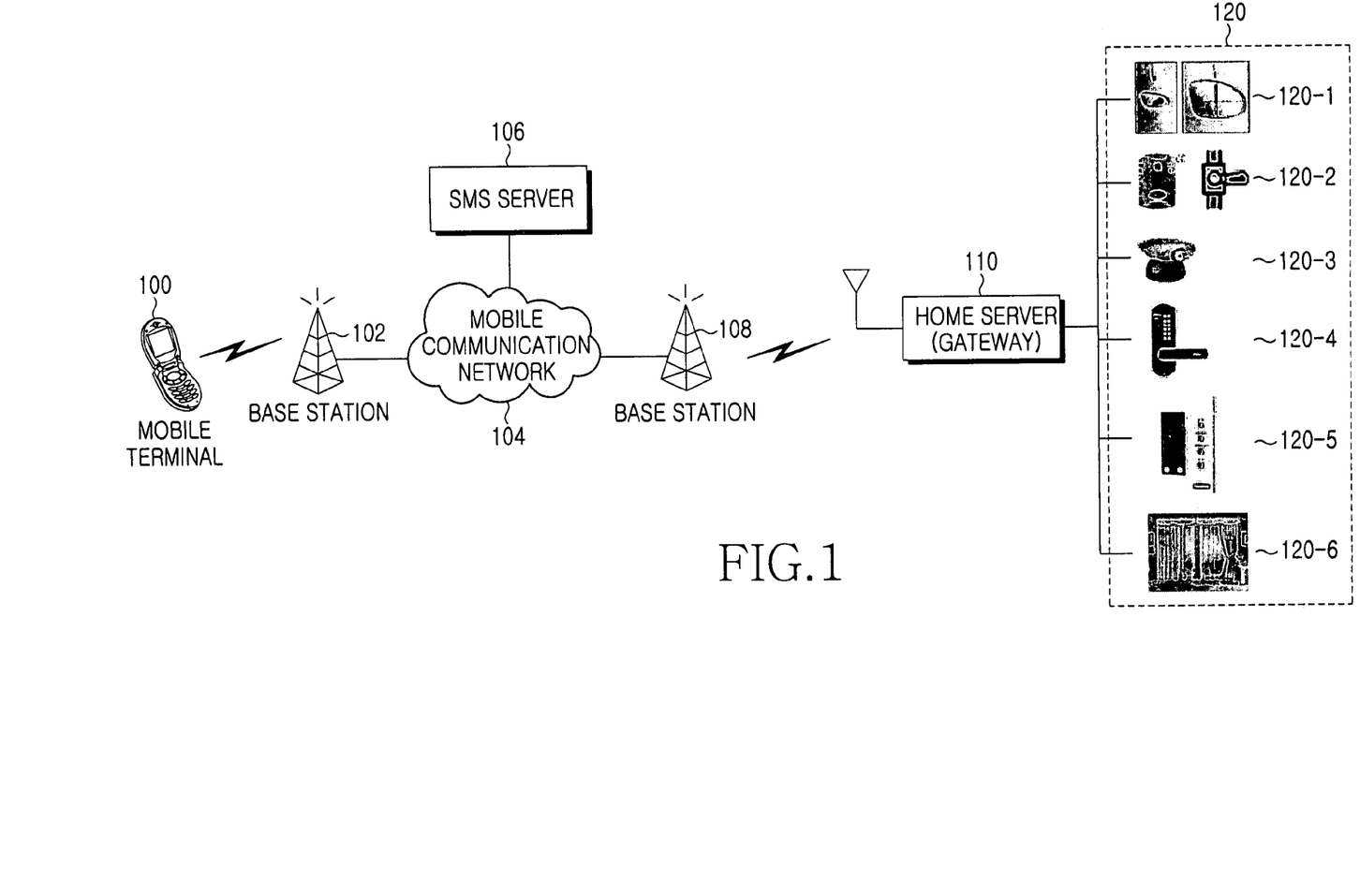
FIG. 1 is a view illustrating the configuration of a home network system according to the present invention.

FIG. 1 is a view illustrating the home network system according to the present invention. Referring to FIG. 1, the home network system includes a mobile terminal 100 having an SMS function and a home server 110 for controlling one or more home appliances 120. The mobile terminal 100 and the home server 110 communicate with each other through base stations 102 and 108 and a mobile communication network 104. The home network system also includes an SMS server 106 for providing SMS services. The home appliances 120 are electronic devices, such as a room light 120-1, a gas valve 120-2, a security camera 120-3, a digital door-lock 120-4, a thermostat 120-5 and an automatic curtain 120-6.

Figure 2:
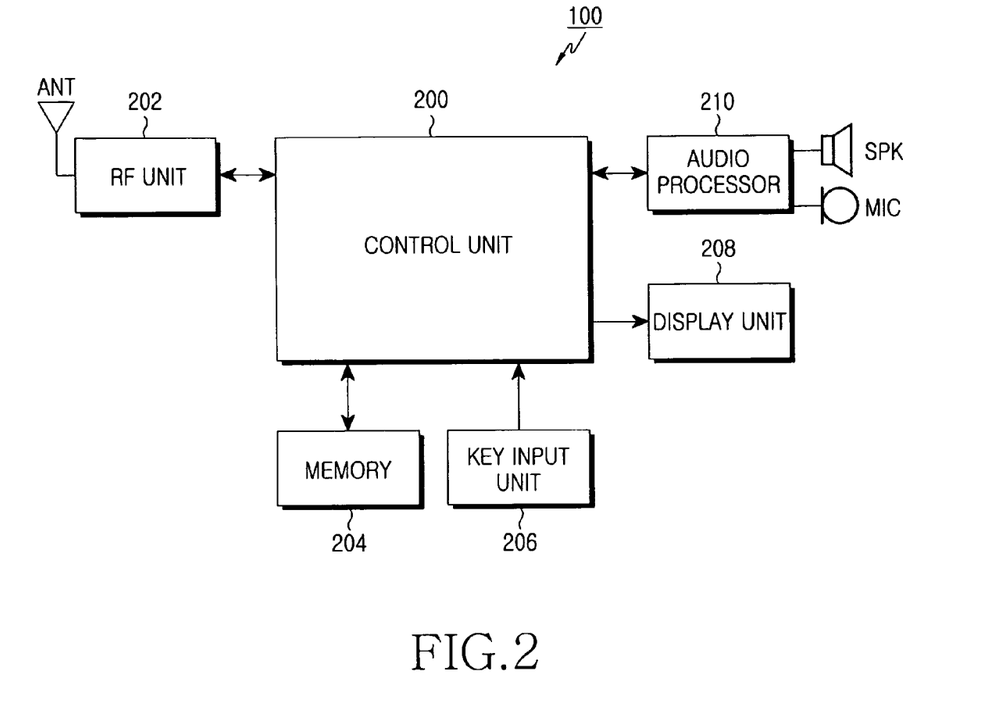
FIG. 2 is a block diagram of a mobile terminal which controls home appliances according to the present invention.

FIG. 2 is a block diagram showing the configuration and operations of the mobile terminal 100 according to the present invention. The mobile terminal 100 includes a control unit 200, an RF unit 202, a memory 204, a key input unit 206, a display unit 208 and an audio processor 210.

The RF unit 202 receives a signal generated from the control unit 200, performs digital wireless modulation on the received signal and transmits the modulated signal through an antenna. The RF unit 202 demodulates a signal received through the antenna and delivers the demodulated signal to the control unit 200.

The memory 204 may be composed of a ROM (Read Only Memory) and a RAM (Random Access Memory) for storing a plurality of programs and data. Particularly, the memory 204 stores programs and data necessary to control home appliances using SMS according to the present invention. Also, the memory 204 stores a data table which includes control codes representing respective home appliances and the status of the home appliances. The data table can be displayed on the display unit of the mobile terminal 100 as illustrated in FIG. 5.

Figure 5:
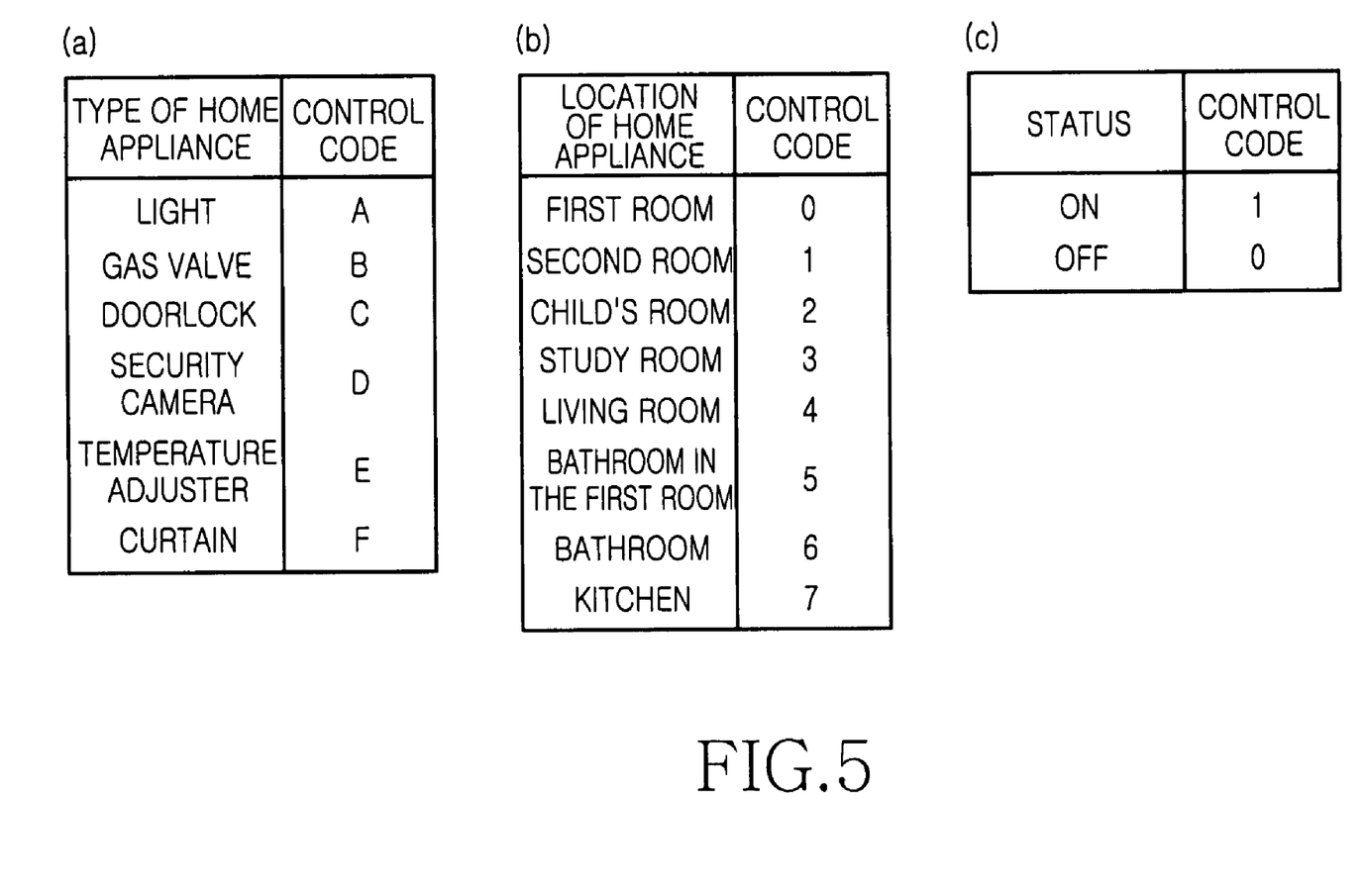
FIG. 5 is a view illustrating a mobile terminal which displays a data table including control codes for controlling the status of home appliances according to the present invention.

Referring to FIG. 5, the data table consists of control codes representing respective home appliances (FIG. 5(a)), control codes representing the locations of the home appliances (FIG. 5(b)) and control codes representing the status of the home appliances (FIG. 5(c)). Although FIG. 5(c) depicts only on/off status of the home appliances, control codes representing any other status, such as temperatures adjusted, can be added to the data table.

referring back to FIGS. 1-2, the memory 204 stores a password and a home server ID which are necessary for access authentication to access the home server 110, and an access code which represents an access request to the home server 110. Also, the memory 204 stores an image file necessary to compose graphic user interfaces (GUI) using the control codes representing the status of the home appliances. Specifically, the memory 204 can store images of the home appliances which are represented by the control codes in the data table of FIG. 5. Two or more images can be stored for each home appliance according to the status of the appliance. For example, two different light images can be stored to represent the "on" and "off" status, respectively. The image file can be previously stored in the mobile terminal or included in a message transmitted from the home server 110 in case of a first access requested by the mobile terminal 100. In the present invention, it is assumed that the images in the image file are icons representing the status of the home appliances.

The control unit 200 controls overall operations of the mobile terminal 100. When the user inputs an access request to the home server 110 in order to control one or more specific home appliances, the control unit 200 generates a short message and sends the short message to the home server 110. At this time, the user can input the access request using a menu provided in the mobile terminal 100. Upon detecting the request, the control unit 200 reads out an access code for requesting access and a password for authentication from the memory 204 and automatically generates a short message including the access code and the password. Hence, the user can access the home server 110 simply by selecting the access menu on the mobile terminal 100. The content of the short message automatically generated in response to the user's request is not displayed on the display unit 208 of the mobile terminal 100. When a short message is received from the home server 200, the control unit 200 compares the control codes included in the received short message with the data table to confirm the status of the plurality of home appliances. The control unit 200 then displays icons representing the status of the respective home appliances on the display unit 208. When the user inputs a key for controlling the status of a home appliance corresponding to a specific icon, the control unit 200 generates a short message including the control codes for controlling the status of the corresponding home appliance. In this connection, if the user clicks on a displayed icon once, the control unit 200 will recognize it as an input for turning on the corresponding home appliance. If the user clicks on the same icon twice, the control unit 200 will then recognize it as an input for turning off the corresponding home appliance. In this manner, the input for controlling the status of a home appliance can be made in a toggling manner. Also, the control unit 200 produces a combination of the control codes for controlling the status of the corresponding home appliance by reference to the data table and includes the combination of the control codes in the short message.

Figure 6:
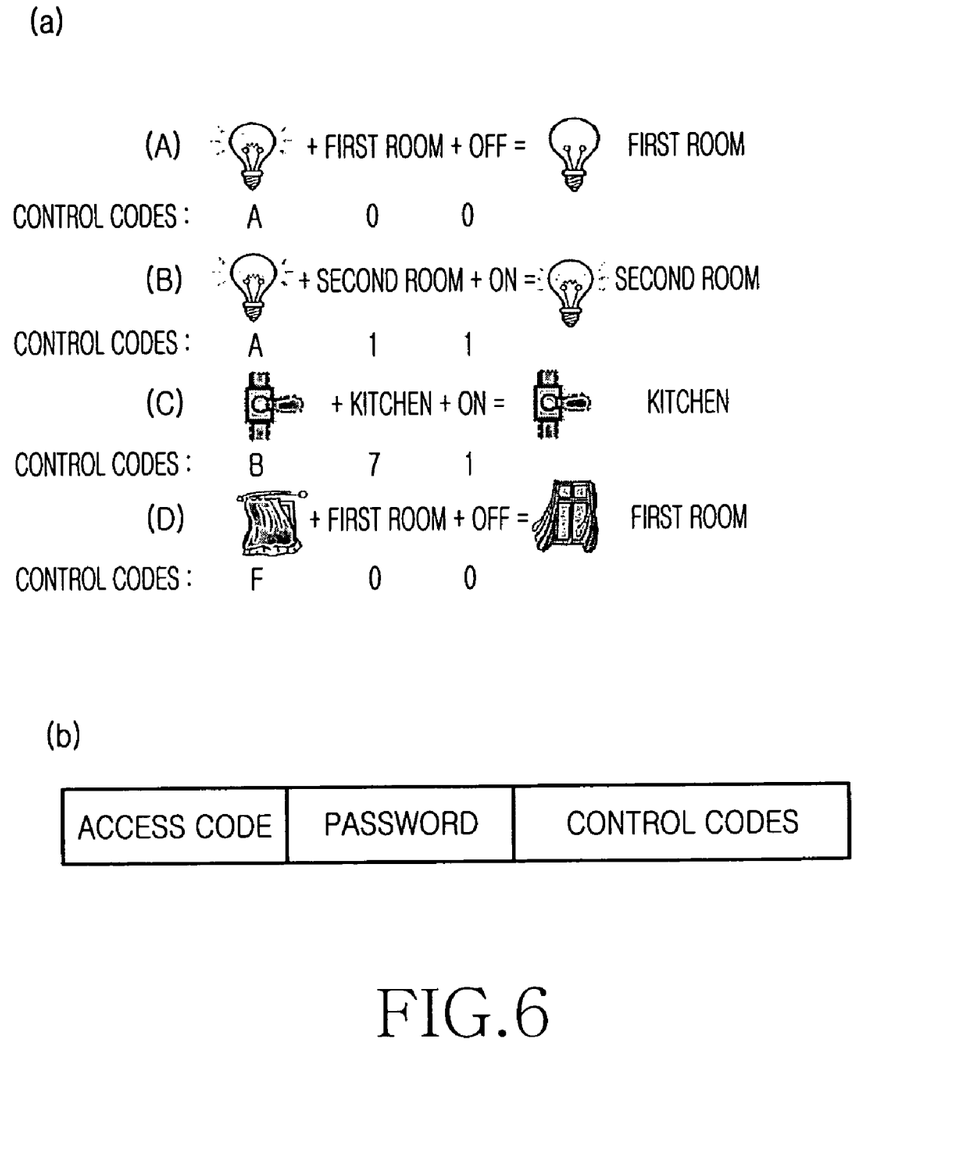
FIG. 6 is a view illustrating a combination of control codes for controlling home appliances according to the present invention.

Referring to FIG. 6, if the user inputs a key to turn off the light in a first room, a combination "A00" of the control code "A" representing the light, the control code "0" representing the location (first room) of the light and the control code "0" representing the off status will be included in the short message. If the user inputs keys to control the light in the first room to be turned off, the light in a second room to be turned on, the gas valve in the kitchen to be off, and the curtain in the living room to be off, the control codes will be combined into "A00A11B71F00" which will then be included in the short message. Referring to FIG. 6(*b*), the short message generated and sent from the mobile terminal 100 includes an access code, a password for authentication, and a combination of control codes.

As an interface, the key input unit 206 is provided with a plurality of alphanumeric keys for inputting numbers or characters and function keys for implementing various functions (e.g., a camera key and a volume key).

The display unit 208 may comprise a liquid crystal display (LCD). It outputs various display data generated in the mobile terminal 100. Under the control of the control unit 200, the audio processor 210 converts audio data into an audio signal audible by the user and outputs the audio signal through the speaker. Also, the audio processor 210 modulates an audio signal received from a microphone, converts the signal into audio data and outputs the data to the control unit 200. The home server 110 provides status information of the home appliances when receiving a short message requesting access thereto or a short message for controlling a specific home appliance from the mobile terminal 100. Hereinafter, the structure and operations of the home server 110 will be explained in detail.

Figure 3:
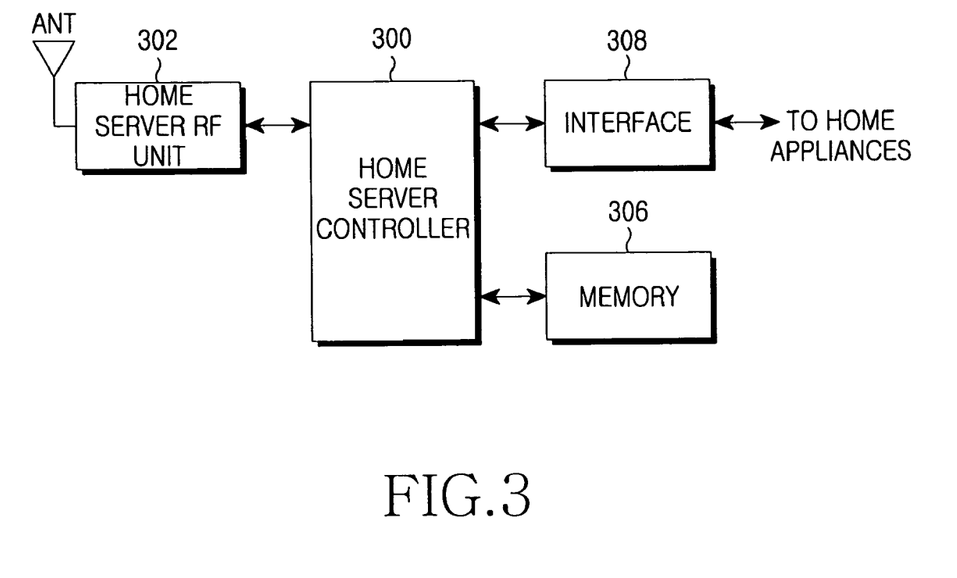
FIG. 3 is a block diagram showing the structure of a home server according to the present invention.

FIG. 3 is a block diagram of the home server 110 according to the present invention. Referring to FIG. 3, the home server 110 includes a home server controller 300, a home server RF unit 302, a memory 306 and an interface 308.

The home server RF unit 302 receives a signal generated from the home server controller 300, performs digital wireless modulation on the received signal and transmits the modulated signal through an antenna. Also, the home server RF unit 302 demodulates a signal received through the antenna and delivers the demodulated signal to the home server controller 300.

The memory 306 may be composed of a ROM (Read Only Memory) and a RAM (Random Access Memory) for storing a plurality of programs and data. Particularly, the memory 306 stores programs and data necessary to control home appliances using SMS according to the present invention. Also, the memory 306 stores a data table which includes control codes representing respective home appliances and the status of the home appliances according to the present invention. The data table stored in the memory 306 is identical to that stored in the memory 204 of the mobile terminal 100. The memory 306 also stores a password for authenticating the mobile terminal 100, an access code representing an access request to the home server 110 and a mobile terminal ID. In addition, the memory 306 stores an image file for composing graphic user interfaces (GUI) using the control codes representing the status of the home appliances. The image file is provided when the mobile terminal 100 first accesses to the home server 110.

The home server controller 300 controls overall operations of the home server 110. When a short message is received, the home server controller 300 confirms whether the short message is to request an access to the home server 110 or to control a home appliance. To this end, the home server controller 300 checks the code or codes included in the short message. While a short message requesting access to the home server 110 includes an access code, a short message for controlling a home appliance includes the control codes representing the type, location and status of the home appliance to be controlled.

The operations performed by the home server controller 300 when receiving a short message including an access code will be explained in further detail.

Upon recognizing that a short message received from a mobile terminal is an access request, the home server controller 300 compares the user ID included in the short message with that previously stored in the memory 306. If the user ID in the short message is identical to the previously stored one, the home server controller 300 will check the status of the home appliances connected to the home server 110 through the interface 308 and generate control codes representing the status of the home appliances. More specifically, the home server controller 300 checks the types, locations and status of the connected home appliances and produces a combination of corresponding control codes which are included in the data table of FIG. 5. The home server controller 300 generates a short message including the combination of control codes and sends the generated message to the mobile terminal. When the mobile terminal 100 first accesses to the home server 110, the home server controller 300 also generates a message including an image file for composing graphic user interfaces GUI using the control codes representing the status of the home appliances. Specifically, the home server controller 300 generates an MMS (Multimedia Messaging Service) message including status information of the home appliances and an image file, and sends the MMS message to the mobile terminal.

The operations performed by the home server controller 300 when receiving a short message including control codes will be explained in further detail.

Upon recognizing that a short message received from a mobile terminal is a request for controlling the status of a home appliance, the home server controller 300 checks the control codes included in the short message and controls the status of a corresponding home appliance. The home server controller 300 then generates a short message including changed status information of the controlled home appliance. This short message may include the status information of the controlled home appliance only or of all the connected home appliances. The home server controller 300 sends the short message with the status information to the mobile terminal.

The interface 308 provides an interface for communicating with each home appliance.

Figure 4:
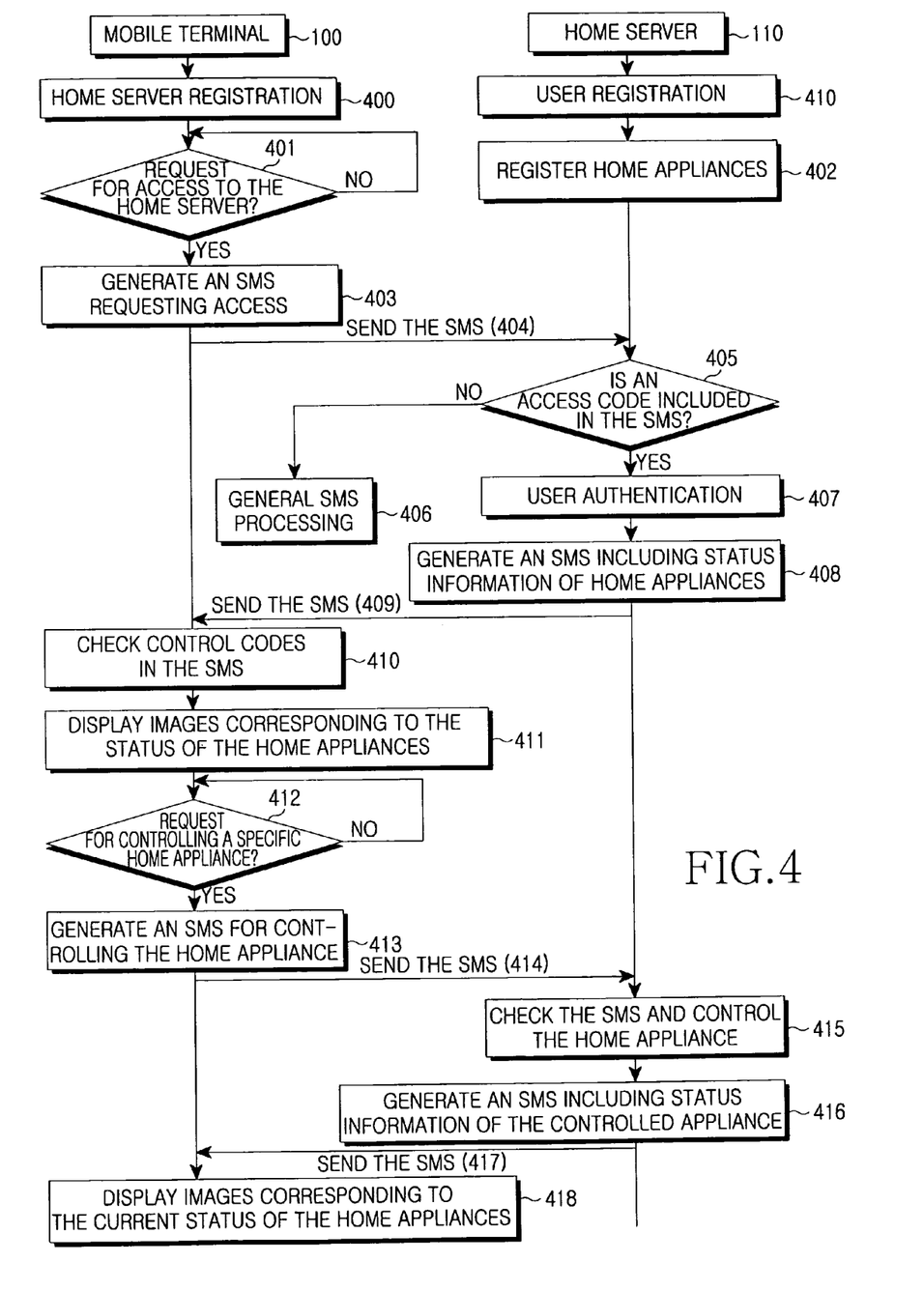
FIG. 4 is a flowchart showing signal flows between a mobile terminal and a home server to control home appliances using a short message according to the present invention.

Signal flows between the mobile terminal 100 and the home server 110 in a home network system to control a home appliance using a short message service will be explained in detail with reference to FIG. 4.

The mobile terminal 100 performs an operation to register a home server in step 400. For this registration, the user has to input a password and a home server ID, which are necessary for access authentication to access the home server 110, through the key input unit 206 so that the password and the home server ID can be stored in the memory 204. The home server 110 also performs an operation to register the user of the mobile terminal 100 in step 410. To this end, the user has to store a password and a mobile terminal ID which are necessary for authentication of the mobile terminal 100 in the memory 306. The mobile terminal ID can be an electronic serial number (ESN).

When an access request to the home server 110 is inputted by the user in step 401, the mobile terminal 100 proceeds to step 403 in order to automatically generate a short message requesting access to the home server 110. The mobile terminal 100 sends the generated short message to the home server 110 in step 404. The short message includes the access code, terminal ID and password for authentication which were previously stored in the mobile terminal 100. At the same time, the mobile terminal 100 displays a menu relating to the user's request for the home server access.

Upon receiving the short message from the mobile terminal 100, the home server 110 checks whether an access code is included in the short message in step 405. If the access code is included in the short message, the home server 110 will proceed to step 407 in order to perform a user authentication procedure. Otherwise, the home server 110 will proceed to step 406 in order to perform a general SMS processing. In step 407, the home server 110 compares the user ID included in the received short message with the previously stored user ID. If the user ID is identical to the stored user ID, the home server 110 will authenticate the mobile terminal 100 and proceed to step 408. Otherwise, the home server 110 will send a message informing of the failure to authenticate to the mobile terminal 100 or discard the received short message.

In step 408, the home server 110 generates a short message including current status information of the home appliances connected thereto. More specifically, the home server 110 checks the types, locations and statuses of the connected home appliances and generates a short message including a combination of control codes representing the current statuses of the home appliances by reference to the data table of FIG. 5. For example, if the home server 110 confirms that the light in the first room is currently off, the light in the second room on, the gas valve in the kitchen on, and the curtain in the living room down (assuming down corresponds to "OFF"), it will produce a combination of control codes "A00A11B71F40," using the data-table of FIG. 5, and include the combination of control codes in the short message. In step 409, the home server 110 sends the generated short message to the mobile terminal 100. When the mobile terminal 100 first accesses to the home server 110, the home server 110 generates a short message, including an image file for composing GUI, using the control codes representing the status of the home appliances. Specifically, the home server 110 generates an MMS message, including status information of the home appliances and an image file, and sends the MMS message to the mobile terminal 100.

Upon receiving the short message including the status information of the home appliances, the mobile terminal 100 checks the control codes included in the short message in step 410 and displays images corresponding to the status of the home appliances in step 411. In this manner, the mobile terminal 100 confirms the status of the home appliances by checking the control codes in the short message based on the data table stored in the memory, and then displays images corresponding to the status of the home appliances. For example, if a short message including a combination of control codes "A00A11B71F40" is received from the home server 110, the mobile terminal 100 will compare the control codes "A00A11B71F40" with those included in the data table. As a result, the mobile terminal 100 will confirm that the light in the first room is currently turned off, the light in the second room on, the gas valve in the kitchen on, and the curtain in the living room down. Accordingly, the mobile terminal 100 will display icons representing the status of the home appliances. If an image file containing the icons is included in the short message received in step 409, the mobile terminal 100 will store the image file, check the status of the home appliances and then display the corresponding icons.

If the user clicks on any displayed icon to control the status of the corresponding home appliance in step 412, the mobile terminal 100 will generate a short message for controlling the status of the home appliance in step 413. For example, after confirming that the light in the first room is currently turned off, the light in the second room on, the gas valve in the kitchen on, and the curtain in the living room down, the user may click on an icon representing the status of the gas valve in order to close off the gas valve. In such a case, the mobile terminal 100 generates a short message including a combination of control codes "B70" and sends the short message to the home server 110 in step 414.

Upon receiving the short message for controlling the status of a specific home appliance (e.g., gas valve), the home server 110 checks the control codes included in the received short message and controls the status of the specific home appliance accordingly in step 415. Hence, when a short message including a combination of control codes "B70" is received, the home server 110 checks the control codes and controls the gas valve in the kitchen to be turned off. Subsequently, the home server 110 generates a short message including changed status information of the controlled home appliance in step 416. This short message may include the status information of the controlled home appliance only or of all the home appliances. The home server 110 sends the short message generated in step 416 to the mobile terminal 100 in step 417.

The mobile terminal 100 receives the short message including the status information of the controlled home appliance or of all the home appliances. The mobile terminal 100 then checks the control codes included in the short message and displays an icon corresponding to the current status of the controlled home appliance.

Figure 7:
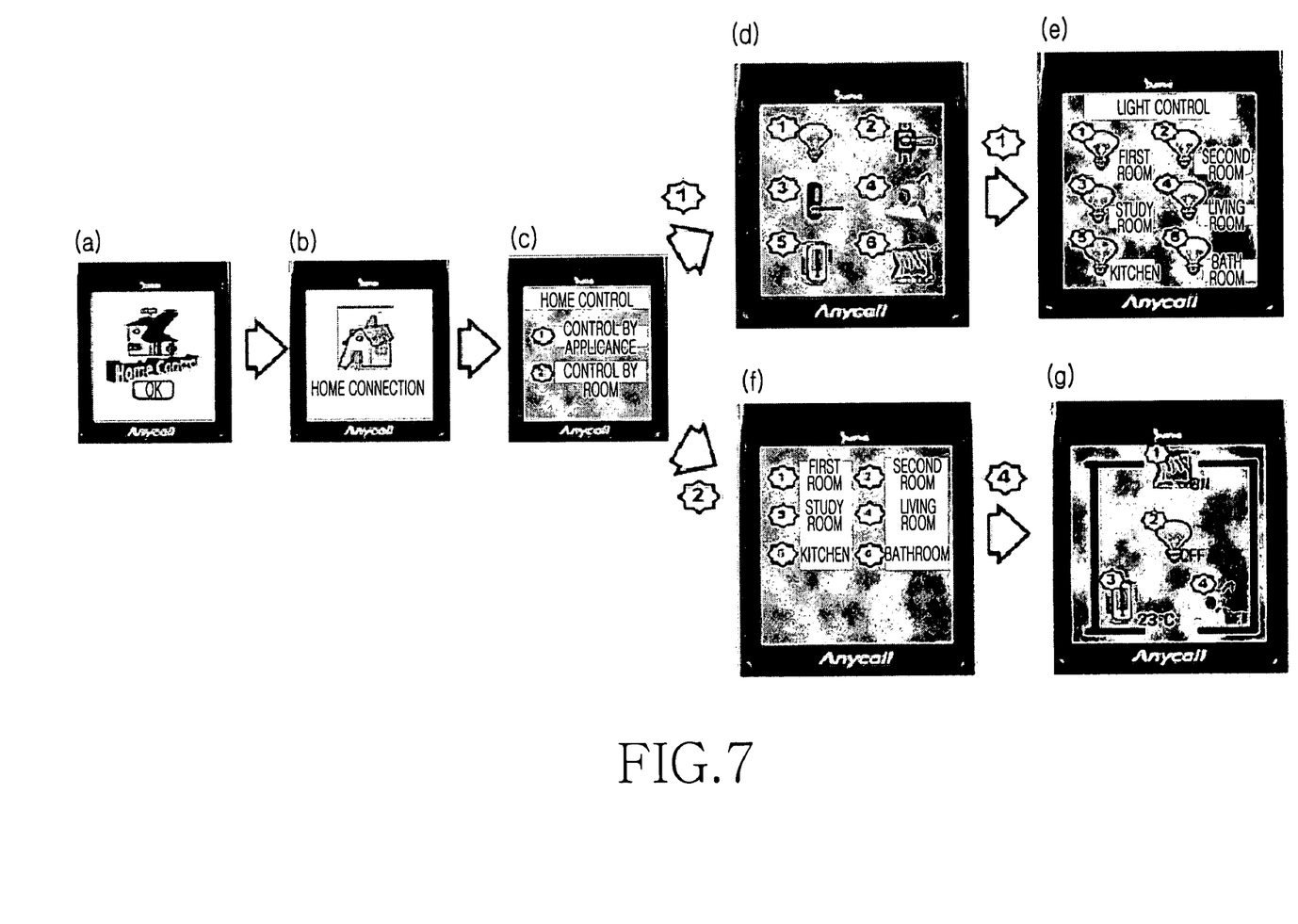
FIG. 7 is a view illustrating images displayed on a mobile terminal during a process for controlling home appliances according to the present invention.

FIG. 7 is a view illustrating images displayed on a mobile terminal during a process for controlling home appliances according to the present invention.

When the user inputs an access request to the home server 110, the mobile terminal 100 displays a picture as illustrated in FIG. 7(a). Subsequently, the mobile terminal 100 sends a short message including an access code to the home server 110, and displays a picture as illustrated in FIG. 7(b), until a short message including status information of home appliances is received from the home server 110. When the short message including status information is received from the home server 110, the mobile terminal 100 then displays a picture as illustrated in FIG. 7(c) so that the user can select a control according to the type of home appliances or to the location (room).

If the user selects a control according to the type of home appliances, the mobile terminal 100 will check control codes included in the short message received from the home server 110 and display images showing the status of the home appliances as illustrated in FIG. 7(d). If the user selects a light image numbered "1" during the display of the images, the mobile terminal 100 will check the locations of all lights in the home and display images indicating the locations as illustrated in FIG. 7(*e*).

If the user selects a control according to the location of home appliances, the mobile terminal 100 will check the control codes included in the short message received from the home server 110 and display a picture as illustrated in FIG. 7(*f*). If the user selects "4. first room" during the display of the picture, the mobile terminal 100 will check the home appliances located in the first room and display images showing the home appliances in the first room as illustrated in FIG. 7(*g*).

As explained above, a mobile terminal according to the present invention provides a GUI so that a user can select a home appliance to be controlled or the desired status of a home appliance using a home appliance control menu. Therefore, the user can easily control any home appliance using the home appliance control menu, without having to directly input control codes for controlling the home appliance.

Although preferred embodiments of the present invention have been described for illustrative purposes, those of ordinary skill in the art will recognize that various changes and modifications of the embodiment described herein can be made without departing from the scope and spirit of the claimed invention. For example, only the home appliances have been explained as devices controllable using a short message service. However, any wireless devices that can communicate wirelessly with a gateway, such as a home server, can be controlled using a short message service. Accordingly, various modifications, additions and substitutions can be made to the present invention, without departing from the scope and spirit of the invention as defined in the accompanying claims, including the full scope of equivalents thereof.

What is claimed is:

1. A method for controlling home appliances using a short message service in a home network system which includes a mobile terminal for communicating with the home network system through a mobile communication network, and at least one home appliance connected wirelessly to the home network system, said method comprising:

generating, by the mobile terminal, a first short message including a previously stored access code when an access request to the home network system is input by a user, and sending the first short message to the home network system;

receiving, by the mobile terminal, a second short message including control codes corresponding to status information of each home appliance;

storing, by the mobile terminal, a data table including first control codes representing types of home appliances, second control codes representing locations of the home appliances, and third control codes representing a status of the home appliances;

checking, by the mobile terminal, the control codes included in the second short message to confirm the status of each home appliance;

displaying, by the mobile terminal, a home appliance control menu having images that represent the status of each home appliance; and controlling, by the mobile terminal, the at least one home appliance by using the home appliance control menu.

2. The method according to claim 1, wherein controlling the at least one home appliance comprises:

generating, by the mobile terminal, a third short message including control codes for controlling a specific home appliance and sending the third short message to the home network system when a request for controlling the status of the specific home appliance is input by the user;

receiving, by the mobile terminal, after the specific home appliance is controlled according to the control codes included in the sent third short message, a fourth short message including current status information of the controlled home appliance, the mobile terminal checking the control codes included in the received fourth short message to confirm a current status of the controlled home appliance, and displaying an image representing the status of each home appliance.

3. The method according to claim 2, further comprising:

storing, by the mobile terminal, an image file for composing graphic user interfaces using control codes representing the status of the home appliances; and reading out, by the mobile terminal, images representing the status of the home appliances from the stored image file and displaying the images to show the current status of the home appliances.

4. The method according to claim 1, wherein current status information of a home appliance includes a combination of one of the first control codes, one of the second control codes and one of the third control codes.

5. The method according to claim 1, further comprising:

when the mobile terminal accesses a predetermined device in the home network system for a first time, receiving, by the mobile terminal, from the home network system, a multimedia message including an image file for composing graphic user interfaces using the control codes representing the status of each home appliance.

6. A home network system, comprising:

a mobile terminal for automatically generating a first short message including a previously stored access code when an access request to a home network system is input by a user, sending the short first message to the home network system, receiving a second short message including status information of each home appliance from the home network system, checking control codes included in the received second short message to confirm a status of each home appliance, displaying a home appliance control menu having images that represent the status of each home appliance, and controlling the at least one home appliance by using the home appliance control menu, wherein the mobile terminal includes a memory for storing a data table including first control codes representing types of home appliances, second control codes representing locations of the home appliances, and third control codes representing the status of the home appliances.

7. The home network system according to claim 6, wherein said mobile terminal automatically generates a third short message including control codes for controlling a specific home appliance and sends the third short message to the home network system when a request for controlling the status of the specific home appliance is input by the user, receives a fourth short message including current status information of the controlled home appliance from the home network system, checks the control codes included in the received fourth short message to confirm a current status of the controlled home appliance, and displays an image representing the status of each home appliance.

8. The home network system according to claim 7, wherein home network system receives the third short message requesting for control of the specific home appliance, checks the control codes included in the received third short message to control the specific home appliance, and sends the fourth short message including control codes representing the current status of the controlled home appliance.

9. The home network system according to claim 6, wherein said mobile terminal includes a memory for storing an image file to compose graphic user interfaces using control codes representing the status of the home appliances, and reads out images representing the status of the home appliances from the stored image file in order to display the images to show a current status of the home appliances.

10. The home network system according to claim 6, wherein current status information of a home appliance includes a combination of one of the first control codes, one of the second control codes and one of the third control codes.

11. The home network system according to claim 6, wherein the mobile terminal receives, from the home network system, a multimedia message including an image file for composing graphic user interfaces using the control codes representing the status of the home appliances, when the mobile terminal accesses a predetermined device in the home network system for a first time.

12. A mobile terminal for controlling home appliances using a short message service in a home network system, the mobile terminal for communicating with the home network system through a mobile communication network, and at least one home appliance connected wirelessly to the home network system, the mobile terminal comprising:

a memory for storing a table including first control codes representing types of home appliances, second control codes representing locations of the home appliances, and third control codes representing a status of the home appliances; and a control unit for automatically generating a first short message including a previously stored access code when an access request to the home network system is input by a user, sending the first short message to the home network system, receiving a second short message including current status information of the home appliances, checking the control codes included in the received second short message to confirm a current status of the home appliances, displaying a home appliance control menu having images that represent the status of each home appliance on a display unit, and controlling the at least one home appliance by using the home appliance control menu.

13. The mobile terminal according to claim 12, wherein said memory stores an image file for composing Graphic User Interfaces (GUIs) using control codes representing the status of the home appliances.

14. The mobile terminal according to claim 12, wherein said control unit automatically generates a third short message including control codes for controlling a specific home appliance and sends the third short message to the home network system when a request for controlling a status of the specific home appliance is input by the user.

15. The mobile terminal according to claim 12, wherein current status information of a home appliance includes a combination of one of the first control codes, one of the second control codes and one of the third control codes.

* * * * *